US006635326B2

(12) United States Patent
Ueki et al.

(10) Patent No.: US 6,635,326 B2
(45) Date of Patent: Oct. 21, 2003

(54) PERSONAL INFORMATION PROTECTING SHEET

(75) Inventors: Mariko Ueki, Nagoya (JP); Yayoi Toyama, Nagoya (JP); Kenji Hirose, Nagoya (JP); Takao Tsubouchi, Nagoya (JP)

(73) Assignee: Hisago Kabushiki Kaisha, Aichi (JP)

( * ) Notice: Subject to any disclaimer, the term of this patent is extended or adjusted under 35 U.S.C. 154(b) by 106 days.

(21) Appl. No.: 09/838,187

(22) Filed: Apr. 20, 2001

(65) Prior Publication Data

US 2001/0033908 A1 Oct. 25, 2001

(30) Foreign Application Priority Data

Apr. 20, 2000 (JP) ....................................... 2000-119848

(51) Int. Cl.[7] .................................................. B32B 3/10

(52) U.S. Cl. .......................... 428/40.1; 40/299; 40/324; 281/81; 281/900; 428/41.3; 428/41.7; 428/42.2; 428/42.3; 428/43; 428/192

(58) Field of Search ............................... 428/40.1, 41.3, 428/41.7, 42.1, 42.2, 42.3, 43, 192; 283/81, 900; 40/299, 324

(56) References Cited

U.S. PATENT DOCUMENTS

| | | | | |
|---|---|---|---|---|
| 2,374,723 A | | 5/1945 | Barghausen | 282/22 |
| 3,227,473 A | | 1/1966 | Halbern | 282/23 |
| 4,309,468 A | * | 1/1982 | St. Aubin | 428/42.1 |
| 5,352,155 A | * | 10/1994 | Fahey | 462/25 |
| 5,792,536 A | * | 8/1998 | Whipp | 428/40.1 |
| 5,916,665 A | | 6/1999 | Sinnhuber | 428/195 |

FOREIGN PATENT DOCUMENTS

| | | | |
|---|---|---|---|
| DE | 195 18 901 | | 11/1996 |
| DE | 19859789 | * | 6/2000 |
| JP | 63-118298 | | 5/1988 |
| JP | 9-512346 | | 12/1997 |
| JP | 2000-79964 | | 3/2000 |
| JP | 2001-175175 | | 6/2001 |
| WO | 95/29475 | | 11/1995 |

* cited by examiner

*Primary Examiner*—Nasser Ahmad
(74) *Attorney, Agent, or Firm*—Wenderoth, Lind & Ponack, L.L.P.

(57) ABSTRACT

A personal information protecting sheet includes a base sheet and an information carrying sheet carrying a piece of personal information bonded to the base sheet so as to be separable from the base sheet. The information carrying sheet includes an information carrying portion on which the personal information is to be carried. The information carrying portion includes a separable portion partitioned by a closed-loop cut line so that the separable portion can be separated from the base sheet.

19 Claims, 9 Drawing Sheets

PERSONAL INFORMATION PROTECTING SHEET

BACKGROUND OF THE INVENTION

1. Field of the Invention

This invention relates to a personal information protecting sheet which can protect information printed thereon against theft after the sheet has been discarded by a simple operation.

2. Description of the Related Art

A tack seal on which an address including a personal name and residence is printed is conventionally stuck on mail such as direct mail. When envelopes and post cards, or an account describing charges for purchase of goods, etc., by means of a credit card, is disposed of as trash, there is a possibility that personal information may be obtained (leak) from the disposed of trash from the tack seals. Division of trash has recently been promoted in view of environmental pollution. With this, transparent or translucent bags are used so that trash in the bags is externally recognized. Accordingly, when a trash bag is externally viewed, the address of mail can easily specify the person who disposed of the trash. The kind of mail that was received and who sent the mail are easily known. Further, the kind of trash that was thrown away is also known. This is not preferable for the person who disposes of the trash.

In order that personal information may be prevented from being stolen, the part of mail bearing the address is folded so that the address is not viewed, or the account describing charges for the purchase of goods etc. by means of a credit card is shredded. However, such work is troublesome.

SUMMARY OF THE INVENTION

Therefore, an object of the present invention is to provide a personal information protecting sheet which can protect information printed thereon against being stolen (leakage) after being discarded by a simple operation.

The present invention provides a personal information protecting sheet comprising a base sheet and an information carrying sheet carrying a piece of personal information bonded to the base sheet so as to be separable therefrom. The information carrying sheet includes an information carrying portion on which the personal information is to be carried. The information carrying portion includes a separable portion partitioned by a closed-loop cut line so that the separable portion can be separated from the base sheet.

According to the above-described personal information protecting sheet, the information carrying portion is formed with the separable portion partitioned by the closed-loop cut line so that the separable portion can be separated from the base sheet. Accordingly, when the protecting sheet is to be disposed of, the information carried on the information carrying portion is fragmented such that the information cannot be easily read. Consequently, the information carried on the information carrying portion can be protected by a simple operation, namely, by separating the separable portion from the base sheet along the closed-loop cut line.

BRIEF DESCRIPTION OF THE DRAWINGS

Other objects, features and advantages of the present invention will become clear upon an understanding of the following description of preferred embodiments, made with reference to the accompanying drawings, in which.

DETAILED DESCRIPTION OF THE PREFERRED EMBODIMENTS

Figure 9:
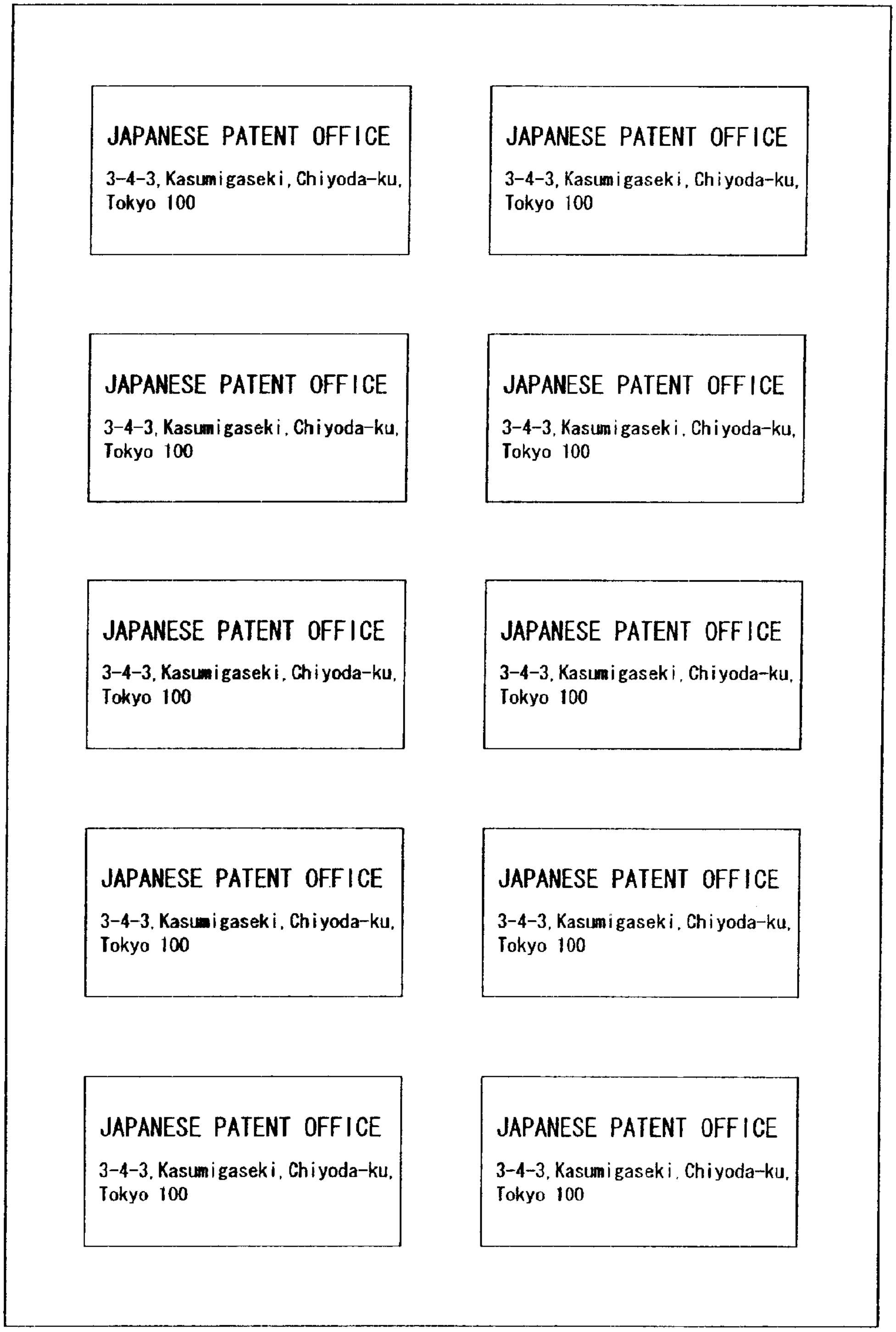
FIG. 9 is a plan view of a conventional tack seal for mail use.

A first embodiment of the present invention will be described with reference to FIGS. 1A to 4. In this embodiment, a personal information protecting sheet of the invention is applied to a conventionally used mail tack seal as shown in FIG. 9. The name and address of an addressee are printed on a surface of the tack seal. The tack seal is then stuck on an envelope or post card.

Referring to FIG. 1A, a personal information protecting sheet 10 has a four-layer structure. More specifically, the sheet 10 includes a piece of printing paper 11 serving as information carrying sheet, a base sheet 12 laminated on a backside of the printing paper, an adhesive layer 13 laminated on a backside of the base sheet, and a separation sheet 14 covering the adhesive layer 13. The adhesive layer 13 of the sheet 10 is stuck on an envelope, etc.

The base sheet 12 is made of a polyethylene film, for example. The polyethylene film is melted at a low temperature and laminated on one side of the printing paper 11 in a melted state such that the printing paper 11 and the base sheet 12 are separable from each other. Further, the adhesive layer 13 comprises a usual paste or adhesive agent. The adhesive layer 13 has a thickness of about 20 $\mu$m whereas the separation sheet 14 has a thickness of about 40 $\mu$m. Since the adhesive layer 13 is provided, the sheet 10 can be stuck on another thing when the separation sheet 14 is removed.

A detaching line 15 is formed over the paper 11, base sheet 12 and adhesive layer 13 as shown in FIG. 1A. The paper 11, base sheet 12 and adhesive layer 13 are cut away together along the detaching line 15 in their laminated state so that each tack 10*a* can be separated from the separation sheet 14, as shown in FIG. 1A and FIG. 1C.

Figure 1:
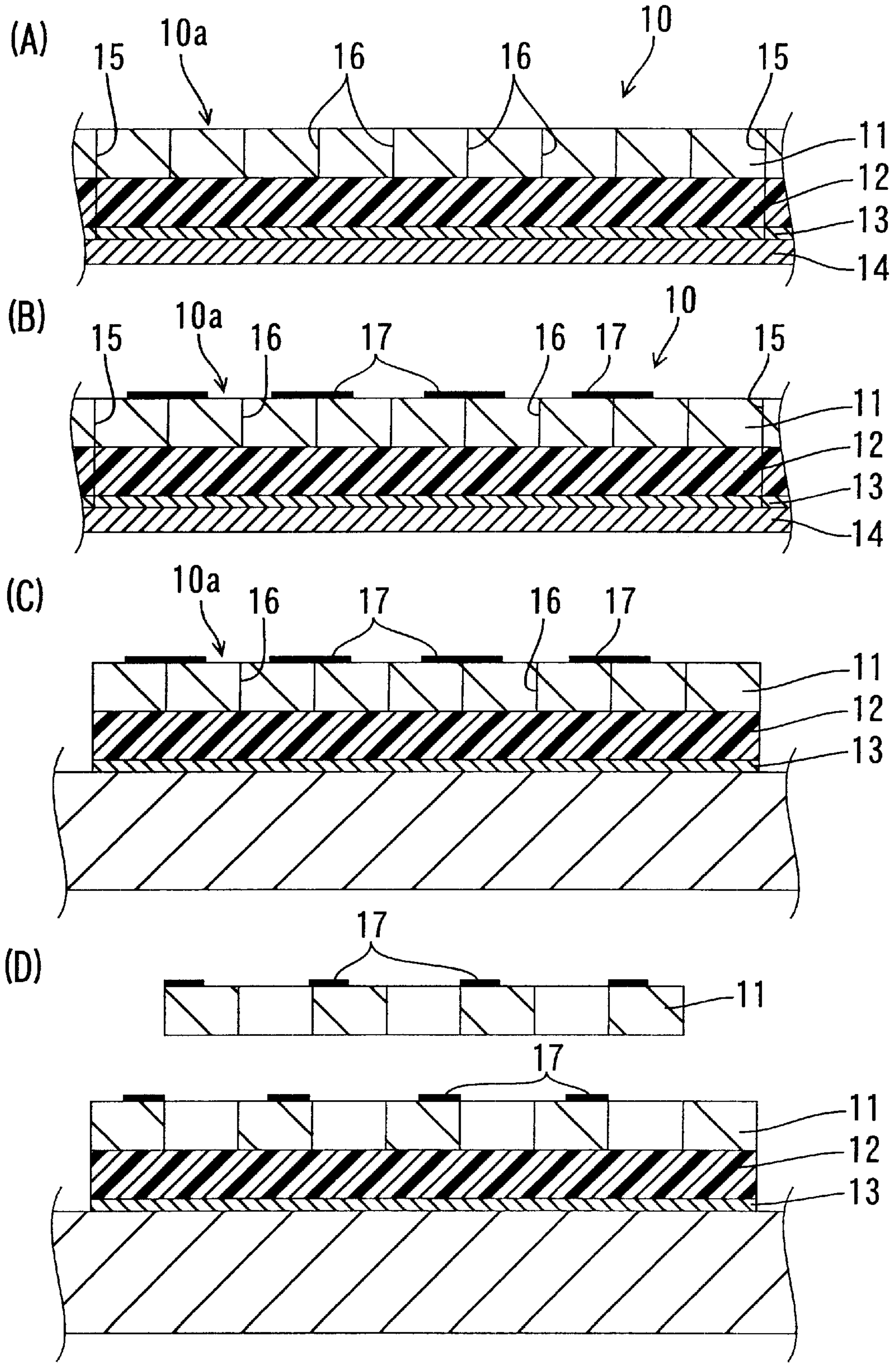
FIGS. 1A to 1D are partially enlarged sections of a personal information protecting sheet of a first embodiment in accordance with the present invention, showing steps of use of the sheet.
Figure 2:
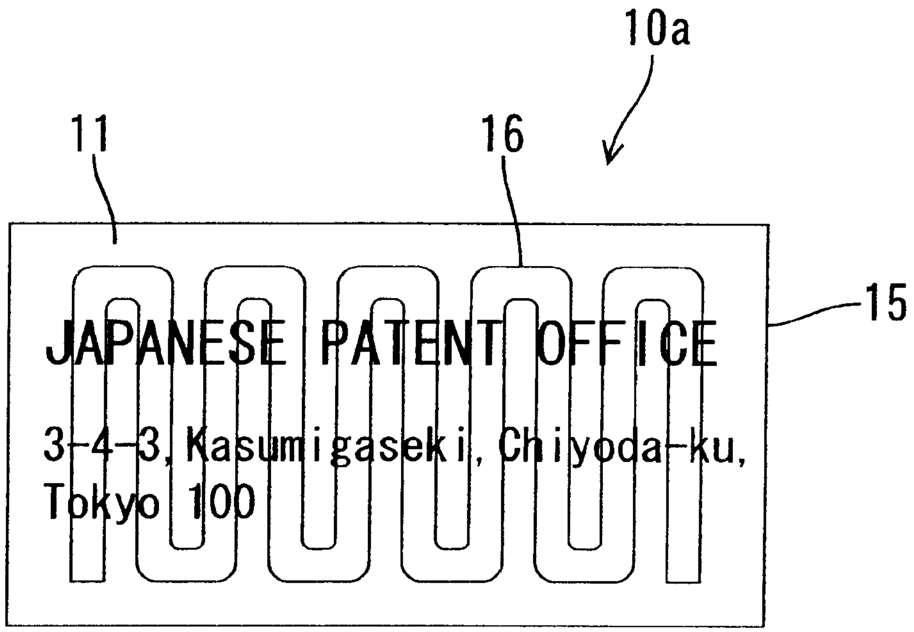
FIG. 2 is a plan view of a tack of the personal information protecting sheet.

The printing paper 11 which is the uppermost layer of each tack 10*a*, has a further cut line 16. Part of the information carrying portion of each tack 10*a* is cut away along the cut line 16 so as to be separable from the other part of the information carrying portion. The cut line 16 extends from one end to the opposite end, or near the detaching line 15, while meandering, as shown in FIG. 2. The cut line 16 is a closed-loop so that part of the paper 11 is cut away from the base sheet 12.

When the above-described sheet 10 is used, an address 17 is printed on the surface of the paper 11 by a printer, etc., in the same manner as on the conventional tack seal, as shown in FIG. 1B. The paper 11, base sheet 12 and adhesive layer 13 are cut away together along the detaching line 15 in a laminated state so that the tack 10*a* is separated from the separation sheet 14. The separated tack 10*a* is stuck on an envelope or post card as shown in FIG. 1C.

Figure 3:
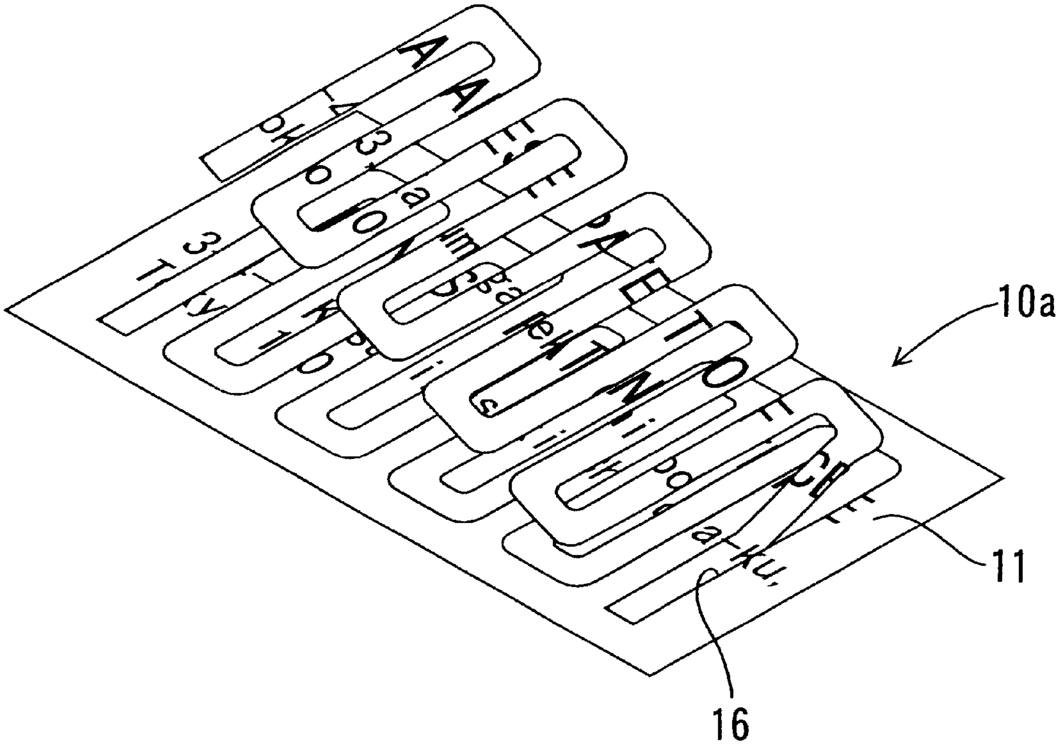
FIG. 3 is a perspective view of the tack, showing the case where a part of the tack is being detached.
Figure 4:
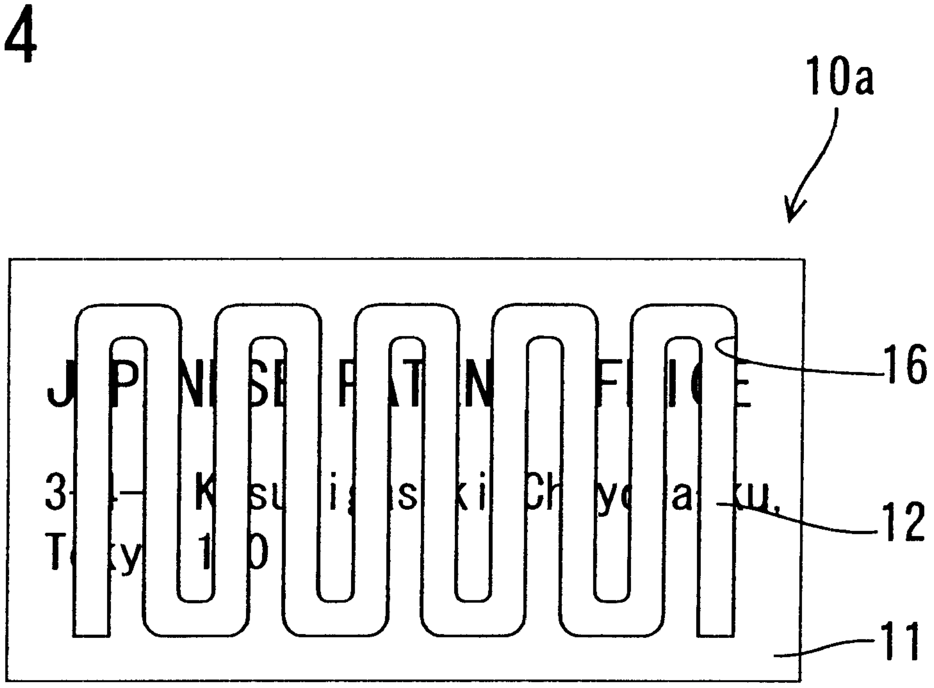
FIG. 4 is a plan view of the tack, showing the state where the part of the tack has been detached.

When an addressee receives the mail on which the tack 10*a* is stuck and then disposes of it, an end of the cut line 16 formed on the tack 10*a* is picked up so that the meandering part of the paper 11 is separated from the base sheet 12, as shown in FIG. 3. Consequently, the information printed on the paper 11 is fragmented such that the information cannot be easily read, as shown in FIG. 3. The information on the separated part of the paper 11 also cannot be easily read. Accordingly, easy theft of the personal information can be prevented when the separated part and the mail are crumpled into respective balls and disposed of individually.

According to the above-described sheet 10, a sender or address may conventionally send the mail, and the addressee only separates the part of the paper 11 along the cut line 16 when the mail is disposed of. By this simple operation, the personal information printed on the tack 10*a* can be protected. Furthermore, since the cut line 16 is meandering and a closed-loop, the personal information can be rendered further difficult to understand when part of the tack 10*a* has been cut away and removed from the remaining part.

Figure 5:
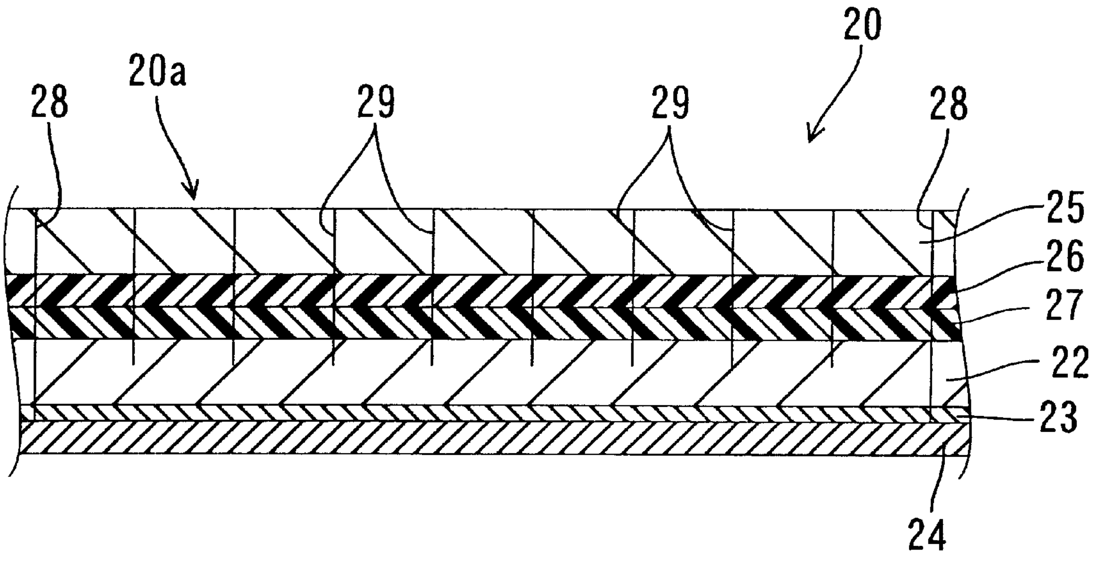
FIG. 5 is a partially enlarged section of a personal information protecting sheet of a second embodiment in accordance with the present invention.

FIG. 5 illustrates a second embodiment of the invention. The personal information protecting sheet 20 of the second embodiment comprises the information carrying sheet 25, the base sheet 22, the adhesive layer 23 and the separation sheet 24 laminated in the same manner as in the first embodiment. Two polyethylene film layers 26 and 27 bonded with each other are interposed between the information carrying sheet 25 and the base sheet 22. The polyethylene film layers 26 and 27 are bonded with the sheets 25 and 22, respectively. Thus, the personal information protecting sheet 20 has a six-layer structure.

The two polyethylene film layers 26 and 27 have respective adhesions differing from each other relative to the other sheets. Accordingly, the adhesion between the film 26 and the information carrying sheet 25 is set so as to be larger than the adhesion between the film 27 and the base sheet 22. When the information carrying sheet 25 is to be separated from the base sheet 22, the film 27 is first separated from the base sheet 22. The adhesion between the film 27 and the sheet 22 is set to be higher than the adhesion between the adhesive layer 23 and the separation sheet 24.

A detaching line 28 is formed over the sheet 25, the polyethylene film layers 26 and 27, the base sheet 22, and the adhesive layer 23 as in the first embodiment. The sheet 25, the polyethylene film layers 26 and 27, the base sheet 22, and the adhesive layer 23 are cut away together along the detaching line 28 in their laminated state in the same manner as in the first embodiment so that each tack 20*a* is separated from the separation sheet 24. Furthermore, each tack 20*a* includes a part for carrying personal information. Part of the information carrying portion of each tack 20*a* is cut away along a cut line 29 so as to be separated from the other part of the information carrying portion. The cut line 29 extends through the information carrying sheet 25 and the polyethylene film layers 26 and 27 while meandering, and then bites slightly into the base sheet 22. The base sheet 22 is made of paper in the second embodiment.

When the above-described sheet 20 is used, an address is printed on the surface of the information carrying sheet 25 by a printer, etc. Subsequently, the information carrying sheet 25, the polyethylene film layers 26 and 27, the base sheet 22, and the adhesive layer 23 are cut away together along the detaching line 28 so that the tack 20*a* is separated from the separation sheet 24. The separated tack 20*a* is stuck on an envelope or post card. Since the separated tack 20*a* has a five-layer structure having the sheet 25, the layers 26 and 27, the base sheet 22, and the adhesive layer 23, it has a suitable strength and accordingly is easy to handle.

Part of the tack 20*a* is separated away from the base sheet 22 along the cut line 29 when an addressee receives the mail on which the tack 20*a* is stuck and then disposes of it. In this case, the adhesion between the film 26 and the information carrying sheet 25 is set so as to be larger than the adhesion between the film 27 and the base sheet 22. As a result, separation does not occur between the film 26 and the information sheet 25, and accordingly the tack 20*a* can be stably separated between the polyethylene film layer 27 and the base sheet 22.

In the above-described second embodiment, too, the printed personal information can be protected when the part of the sheet 25 is separated away along the cut line 29.

Figure 6:
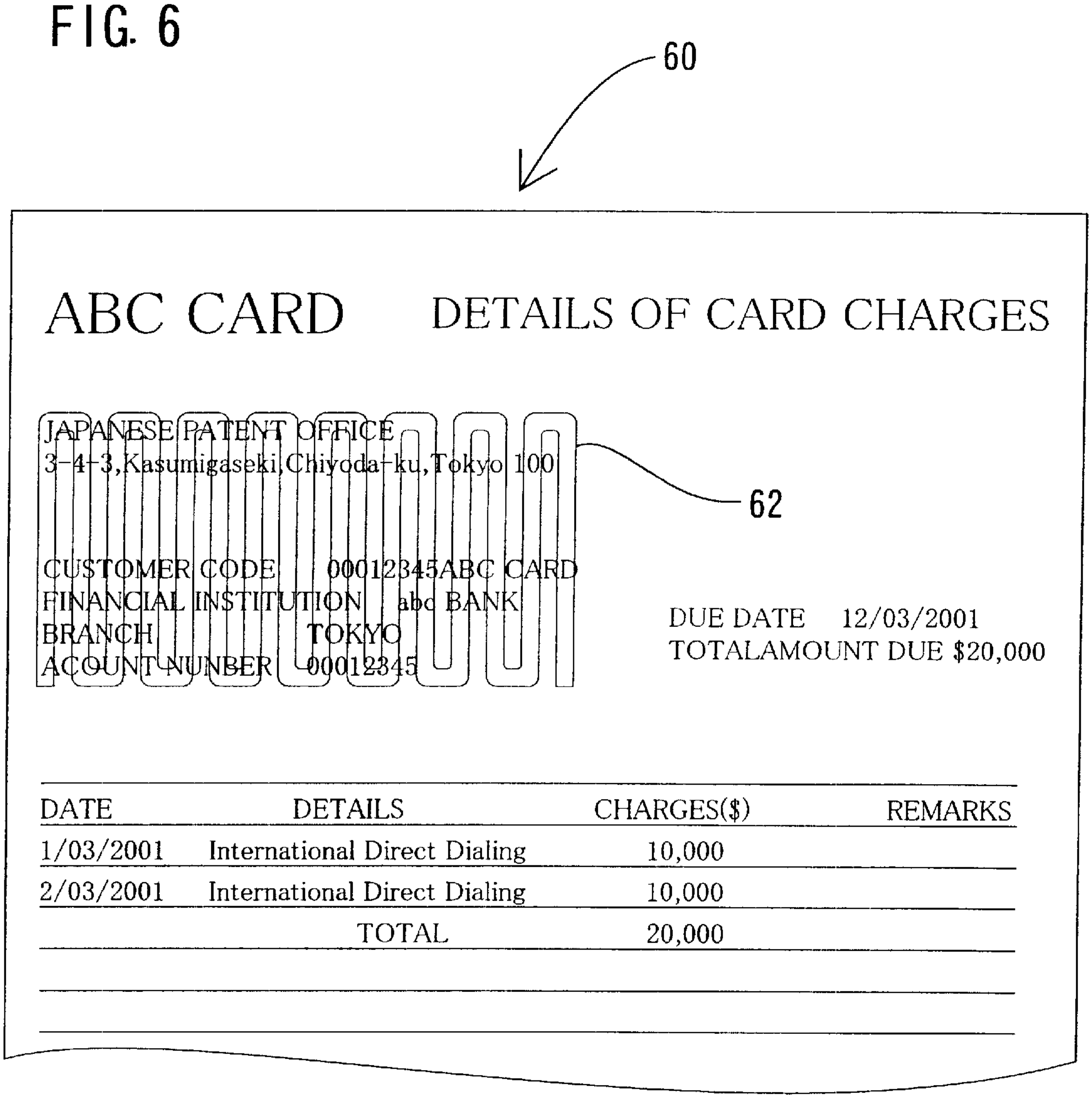
FIG. 6 is a plan view of a personal information protecting sheet of a third embodiment in accordance with the present invention.

In each of the first and second embodiments, the invention is applied to the mail tack seal on which the name and address of the addressee are printed. However, the invention may be applied to an account 60 describing charges for the purchase of goods etc. by means of a credit card as shown in FIG. 6. In the third embodiment, a personal information carrying column of the account 60 is formed with a meandering cut line 62.

Figure 7:
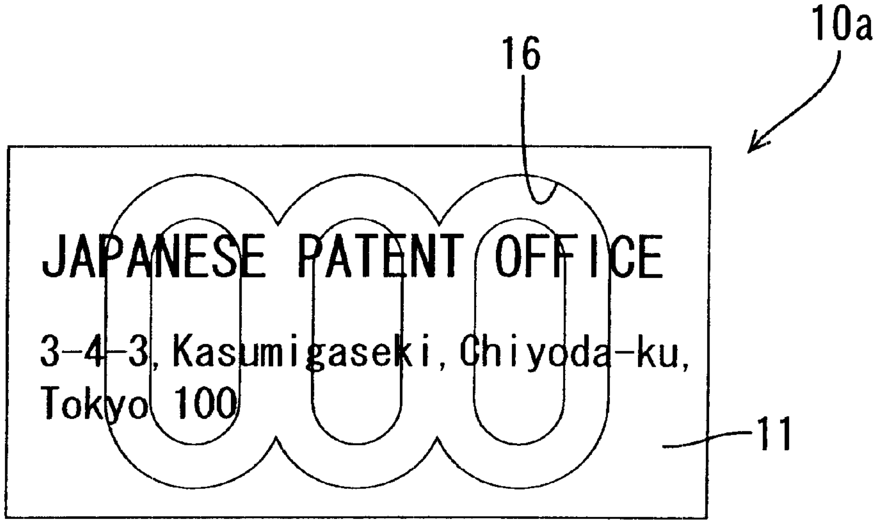
FIG. 7 is a plan view of a personal information protecting sheet of a fourth embodiment in accordance with the present invention.
Figure 8:
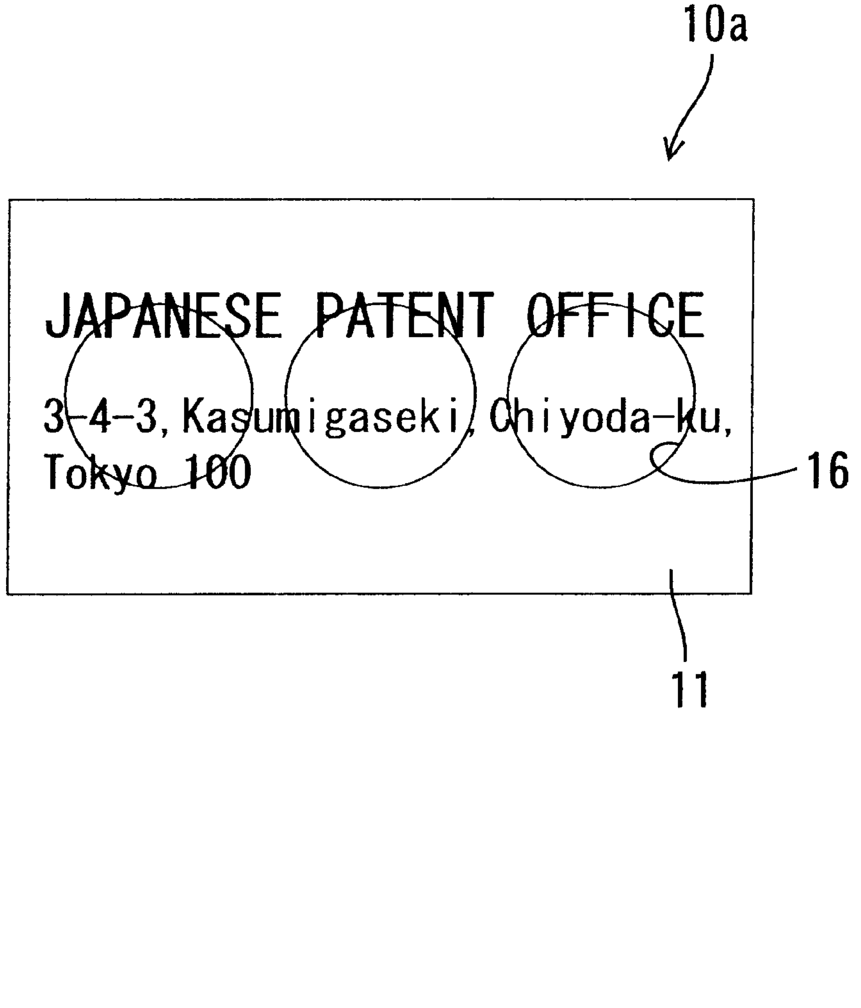
FIG. 8 is a plan view of a personal information protecting sheet of a fifth embodiment in accordance with the present invention.

Although the base sheet is made of the polyethylene film in the first embodiment, the base sheet may be made of another synthetic resin film. In the second embodiment, the protecting sheet 20 comprises the information carrying sheet 25, the two polyethylene film layers 26 and 27, the base sheet 22, the adhesive layer 23 and the separation sheet 24. However, a single layer of polyethylene film may be used instead of the two layers. Additionally, the cut lines 16, 29 and 62 are meandering in the respective foregoing embodiments. However, the cut line may have a shape as shown in FIGS. 7 or 8. Further, the cut line may or may not be a closed-loop.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A personal information protecting sheet, comprising:

a base sheet; and an information carrying sheet for carrying a piece of personal information, said information carrying sheet being bonded to said base sheet so as to be separable therefrom, and said information carrying sheet comprising an information carrying portion on which the personal information is to be carried, said information carrying portion including a separable portion and a remaining portion, said separable portion being completely partitioned from said remaining portion by a continuous cut line that forms a closed-loop so that said separable portion can be separated from said base sheet and said remaining portion;

wherein said separable portion and said remaining portion together define an area in which the personal information is printed; and wherein said cut line is formed such that the personal information is fragmented between said separable portion and said remaining portion within said area in which the personal information is printed upon separation of said separable portion.

2. The protecting sheet of claim 1, wherein said base sheet has two sides, said information carrying sheet is provided on one of said two sides of said base sheet, an adhesive layer is provided on the other of said two sides of said base sheet, and a separation sheet is superposed on said adhesive layer.

3. The protecting sheet of claim 2, wherein said base sheet, said information carrying sheet and said adhesive layer have a detaching line extending therethrough so that said base sheet, said information carrying sheet and said adhesive layer can be detached from said separation sheet in a superposed state.

4. The protecting sheet of claim 1, wherein said area in which the personal information is printed comprises a personal information column for use as an account for describing a credit card charge purchase.

5. The protecting sheet of claim 1, wherein said closed-loop cut line forms a meandering line.

6. The protecting sheet of claim 2, wherein said closed-loop cut line forms a meandering line.

7. The protecting sheet of claim 3, wherein said closed-loop cut line forms a meandering line.

8. The protecting sheet of claim 4, wherein said closed-loop cut line forms a meandering line.

9. The protecting sheet of claim 1, and further comprising two polyethylene film layers bonded to each other, wherein said base sheet and said information carrying sheet are bonded together with said polyethylene film layers sandwiched in-between said base sheet and said information carrying sheet.

10. A personal information protecting sheet, comprising:

a base sheet; and an information carrying sheet carrying a piece of personal information thereon, said information carrying sheet being bonded to said base sheet so as to be separable therefrom, and said information carrying sheet comprising an information carrying portion on which the personal information is carried, said information carrying portion including a separable portion and a remaining portion, said separable portion being completely partitioned from said remaining portion by a continuous cut line that forms a closed-loop so that said separable portion can be separated from said base sheet and said remaining portion;

wherein said separable portion and said remaining portion together define an area in which the personal information is printed; and wherein said cut line is formed such that the personal information is at least partially destroyed upon separation of said separable portion from said remaining portion within said area in which the personal information is printed.

11. The protecting sheet of claim 10, wherein said cut line is formed such that the personal information is at least partially destroyed so as to be more difficult to read from either said separable portion or said remaining portion upon separation of said separable portion from said remaining portion.

12. The protecting sheet of claim 10, wherein said personal information comprises address information.

13. The protecting sheet of claim 10, wherein said personal information comprises financial account information.

14. The protecting sheet of claim 1, wherein said cut line extends completely through said information carrying sheet along the entire extent of said closed loop.

15. The protecting sheet of claim 10, wherein said cut line extends completely through said information carrying sheet along the entire extent of said closed loop.

16. The protecting sheet of claim 1, wherein the entirety of said cut line is spaced inside of the outer periphery of said remaining portion of said information carrying sheet.

17. The protecting sheet of claim 10, wherein the entirety of said cut line is spaced inside of the outer periphery of said remaining portion of said information carrying sheet.

18. The protecting sheet of claim 1, wherein said cut line forming said closed-loop is formed such that said separable portion is entirely free of direct connection to said remaining portion.

19. The protecting sheet of claim 10, wherein said cut line forming said closed-loop is formed such that said separable portion is entirely free of direct connection to said remaining portion.

* * * * *